J. A. LELAND.
CHUCK.
APPLICATION FILED JAN. 4, 1909.

936,644. Patented Oct. 12, 1909.

Witnesses:
Inventor.
J. A. Leland

UNITED STATES PATENT OFFICE.

JOHN A. LELAND, OF MONTAGUE, MASSACHUSETTS, ASSIGNOR TO MILLERS FALLS COMPANY, OF MILLERS FALLS, MASSACHUSETTS, A CORPORATION OF MASSACHUSETTS.

CHUCK.

936,644.   Specification of Letters Patent.   Patented Oct. 12, 1909.

Application filed January 4, 1909. Serial No. 470,694.

*To all whom it may concern:*

Be it known that I, JOHN A. LELAND, of Montague, in the county of Franklin and State of Massachusetts, have invented certain new and useful Improvements in Chucks, of which the following is a specification.

This invention relates to chucks such as are used in connection with bit braces and other like appliances, to grasp bit and drill shanks of different sizes and shapes.

The invention has for its object to provide a chuck of simple, strong, and durable construction adapted to grasp either straight or tapered shanks, the jaws being free to adapt themselves to the shape of the shank, and so mounted that they cannot be subjected to breaking strains by the pressure imparted to them to engage them with the shank.

The invention consists in the improvements which I will now proceed to describe and claim.

Figure 1:
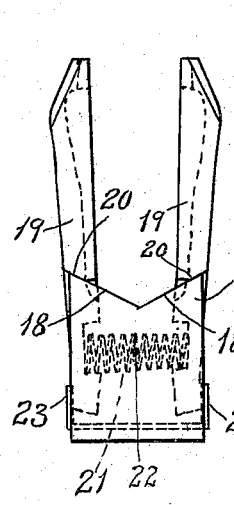
Figure 2:
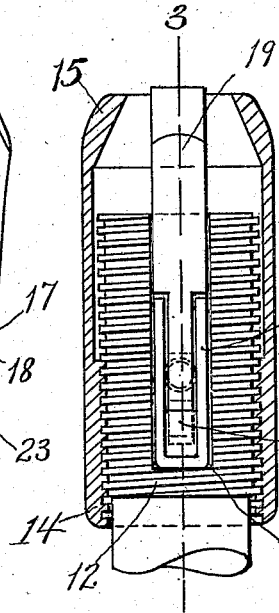
Figures 3, 4:
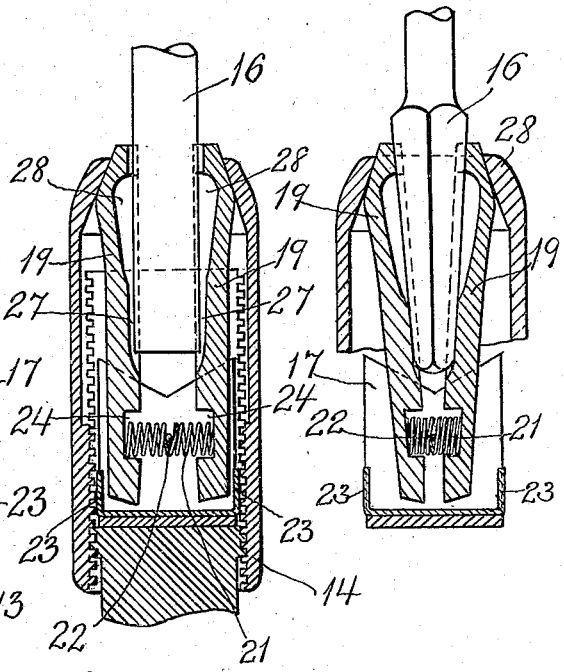
Figure 5:
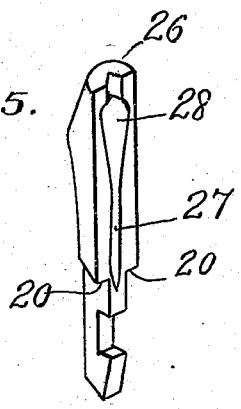

Figure 1 represents a side elevation of the holder and the jaws engaged therewith, the chuck body and the jaw-adjusting sleeve hereinafter referred to, being omitted. Fig. 2 represents an edge view of the jaw holder and one of the jaws, a side elevation of the recessed chuck body, and a longitudinal section of the adjusting sleeve. Fig. 3 represents a section on line 3—3 of Fig. 2, showing the jaws adjusted to a straight shank. Fig. 4 represents a view similar to Fig. 3, showing the jaws adjusted to a tapered shank. Fig. 5 represents a perspective view of one of the jaws.

The same reference characters indicate the same parts in all the figures.

In the drawings, 12 represents the body of the chuck which is or may be a part of a bit brace, or may be provided with suitable means whereby it may be rotated, the said body being provided with a longitudinal slot or recess 13, and with an external screw thread adapted to engage an internal thread on a jaw-adjusting sleeve 14. Said sleeve is adjustable lengthwise on the body by its rotation, and is provided at its outer end with an internal tapering face 15 adapted to bear on the outer ends of the chuck jaws, hereinafter described, and close the jaws upon an interposed bit or drill shank 16 when the sleeve is adjusted inwardly on the body 12.

In the recess 13 is located a jaw holder 17 which is preferably a metal plate bent into a U-shape in cross section, the neck connecting the side portions of the holder bearing on the inner end of the recess 13, while the outer end of each side portion is provided with two oppositely inclined jaw supporting faces 18.

19, 19 represent elongated jaws, each of which is preferably of the general form represented in Fig. 5, each jaw having two inclined lateral shoulders 20 which are adapted to bear and slide upon the inclined faces 18 of the holder. The inner end portions of the jaws are located within the holder and their outer end portions project from the holder and from the body 12, their backs being adapted to engage the inclined inner face 15 of the sleeve. The jaws are movable sidewise and endwise relatively to the holder and are also adapted to stand either parallel with each other, as shown in Fig. 3, to grasp a straight shank 16, or to be inclined relatively to each other, as shown in Fig. 4, to grasp a tapered shank. Means are provided within the holder for pressing the jaws outwardly sidewise, said means being preferably a length of helical spring wire 21 positively engaged at its central portion with the holder to anchor and centralize it. In the construction illustrated, anchoring and centralizing means consists of a pin 22 inserted in the side portions of the holder, and engaging one of the central convolutions of the wire, the end portions of the wire projecting in opposite directions from the pin 22, and constituting in effect two oppositely acting springs which bear upon the inner end portions of the jaws, and force the same outwardly. By anchoring the spring, the assembling of the parts is facilitated because the said spring can first be put in correct position and will remain there while the jaws are being slipped into place. And by having it then centralized, each half presses outwardly the inner end of the jaw with which it is engaged, with the same amount of pressure as is exerted by the other half on the other jaw, instead of merely pressing the said inner ends apart as would be the case if there were no centralizing structure. The holder is provided with fixed stops 23 arranged to limit the outward movement of the inner ends of the jaws, as indicated in Fig. 1. When the holder and jaws are removed from the body 12, the springs act to simultaneously press the inner ends of the jaws against the stops 23, and the jaw shoulders 20 against the inclined faces 18, as shown in Fig. 1.

The jaws and the means for imparting sidewise pressure thereto have provisions for limiting the outward endwise movement of the jaws, thus preventing their removal from the holder, said provisions, as here shown, including recesses 24 in the inner sides of the inner end portions of the jaws, said recesses receiving the ends of the springs. The inner ends of the recesses bear upon the springs when the jaws reach the predetermined outer limit of their endwise movement, as shown in Fig. 1, and thus prevent the withdrawal of the jaws from the holder.

The stops 23 are preferably the upwardly bent ends of a flat metal strip 25 which is of sufficient width to have a tight frictional fit between the side portions of the holder 17.

It will be seen from the foregoing that the springs press the outer ends of the jaws against the sleeve 14, and that when the device is not in use, the springs also hold the inner ends of the jaws at the same time against the stops 23. The loose connection between the jaws and the springs afforded by the elongated recesses 24, permit a considerable freedom of endwise movement of the jaws, as will be seen by comparison of Figs. 3 and 4. When a shank 16 is interposed between the jaws, and the sleeve 14 is adjusted inwardly, the jaws adjust themselves to the shape of the shank, the springs yielding to any extent required to permit the jaws to approach each other, and also to assume various inclinations relatively to each other, and to move lengthwise, as may be required by the shape and size of the shank.

It will also be seen that when the jaws are engaged with a shank, the inward pressure imparted to them is exerted only on the shank, there being no possibility of such contact between the jaws, or between either jaw and any other surface, as would be likely to cause an injurious strain on any part of either jaw.

The inner face of each jaw is provided with longitudinal V-shaped grooves 26 and 27, the edges of which form biting angles adapted to firmly grasp the shank 16. A recess 28 is provided between the grooves 26 and 27, so that each groove is relatively short, and is therefore adapted to slightly indent the surface of the shank 16, and increase the firmness of the hold of the jaws on the shank.

I claim:

1. A chuck comprising a body having a longitudinal recess, a jaw-closing sleeve longitudinally adjustable on said body, a jaw holder located in said recess, and formed of a single piece of metal bent into U-shape the side portions thereof being each provided with oppositely inclined jaw-supporting faces, jaws movable sidewise and endwise relatively to the holder, and having lateral shoulders movable on said inclined faces, the inner ends of the jaws being within the holder, while their outer end portions project from the holder and body and are adapted to engage the sleeve, and means within and carried by the holder for pressing the jaws outwardly sidewise in opposite directions to simultaneously press the jaw shoulders against the inclined faces of the holder, and the backs of the outer end portions of the jaws against the sleeve.

2. A chuck comprising a body having a longitudinal recess, a jaw-closing sleeve longitudinally adjustable on said body, a jaw holder located in said recess, and having side portions, each provided with oppositely inclined jaw-supporting faces, jaws movable sidewise and endwise relatively to the holder, and having lateral shoulders movable on said inclined faces, the inner ends of the jaws being within the holder, while their outer end portions project from the holder and body and are adapted to engage the sleeve, means within and carried by the holder for pressing the jaws outwardly sidewise in opposite directions to simultaneously press the jaw shoulders against the inclined faces of the holder, and the backs of the outer end portions of the jaws against the sleeve, and stops formed of a U-shaped plate affixed to the holder and having members adapted to limit the outward movement of the inner ends of the jaws, the inclined faces acting at the same time to limit the outward movement of the outer ends of the jaws.

3. A chuck comprising a body having a longitudinal recess, a jaw-closing sleeve longitudinally adjustable on said body, a jaw holder located in said recess, and formed of a single piece of metal bent into U-shape the side portions thereof being each provided with oppositely inclined jaw-supporting faces, jaws movable sidewise and endwise relatively to the holder, and having lateral shoulders movable on said inclined faces, the inner ends of the jaws being within the holder, while their outer end portions project from the holder and body and are adapted to engage the sleeve, and means within and carried by the holder for pressing the jaws outwardly sidewise in opposite directions to simultaneously press the jaw shoulders against the inclined faces of the holder, and the backs of the outer end portions of the jaws against the sleeve, and stops formed of a U-shaped plate affixed to the holder and having members adapted to limit the outward movement of the inner ends of the jaws.

4. A chuck comprising a body having a longitudinal recess, a jaw-closing sleeve longitudinally adjustable on said body, a jaw holder located in said recess, and having side portions, each provided with oppositely inclined jaw-supporting faces, jaws movable sidewise and endwise relatively to the holder, and having lateral shoulders movable on said inclined faces, the inner ends of the jaws being within the holder, while their outer end portions project from the holder and body and are adapted to engage the sleeve, the jaws having recesses in the inner sides of their inner end portions, and a spring engaged at its central portion with the holder, and at its end portions with said recesses, the spring being anchored and centralized by its engagement with the holder.

5. A chuck comprising a body having a longitudinal recess, a jaw-closing sleeve longitudinally adjustable on said body, a jaw holder located in said recess, and having side portions, each provided with oppositely inclined jaw-supporting faces, jaws movable sidewise and endwise relatively to the holder, and having lateral shoulders movable on said inclined faces, the inner ends of the jaws being within the holder, while their outer end portions project from the holder and body and are adapted to engage the sleeve, the jaws having recesses in the inner sides of their inner end portions, a spring engaged centrally with the holder and at its ends with said recesses, and adapted to limit the endwise outward movement of the jaws, anchored and centralized by its engagement with the holder, and stops affixed to the holder and adapted to limit the sidewise movement of the inner ends of the jaws.

In testimony whereof I have affixed my signature, in presence of two witnesses.

JOHN A. LELAND.

Witnesses:
KATHERINE E. NICHOLS,
EARLE A. BROWN.